US012221949B2

(12) United States Patent
Turcato et al.

(10) Patent No.: US 12,221,949 B2
(45) Date of Patent: Feb. 11, 2025

(54) KAPLAN-TYPE TURBINE

(71) Applicant: Zeco Di Zerbaro E Costa E C. S.R.L., Fara Vicentino (IT)

(72) Inventors: Davide Turcato, Carre' (IT); Roberto Migliorini, Monticello Conte Otto (IT); Francesco De Pretto, Piovene Rocchette (IT)

(73) Assignee: Zeco Di Zerbaro E Costa E C. S.R.L., Fara Vicentino (IT)

( * ) Notice: Subject to any disclaimer, the term of this patent is extended or adjusted under 35 U.S.C. 154(b) by 0 days.

(21) Appl. No.: 18/565,419

(22) PCT Filed: Nov. 10, 2022

(86) PCT No.: PCT/IB2022/060836
§ 371 (c)(1),
(2) Date: Nov. 29, 2023

(87) PCT Pub. No.: WO2023/084443
PCT Pub. Date: May 19, 2023

(65) Prior Publication Data
US 2024/0263603 A1 Aug. 8, 2024

(30) Foreign Application Priority Data
Nov. 12, 2021 (IT) .................. 102021000028808

(51) Int. Cl.
*F03B 3/12* (2006.01)
*F03B 3/06* (2006.01)
*H02K 7/18* (2006.01)

(52) U.S. Cl.
CPC ............... *F03B 3/123* (2013.01); *F03B 3/06* (2013.01); *H02K 7/1823* (2013.01); *F05B 2220/706* (2013.01)

(58) Field of Classification Search
CPC . F03B 3/123; F03B 3/06; F03B 3/145; H02K 7/1823; F05B 2220/706;
(Continued)

(56) References Cited

U.S. PATENT DOCUMENTS 2,754,764 A * 7/1956 Mead ...................... F16D 33/04
416/165
4,668,307 A 5/1987 Schapira et al.

FOREIGN PATENT DOCUMENTS

| CN | 112 196 811 A | 1/2021 |
|---|---|---|
| DE | 39 21 570 A1 | 1/1991 |

(Continued)

OTHER PUBLICATIONS

International Search Report and Written Opinion dated Feb. 10, 2023, issued in PCT Application No. PCT/IB2022/060836, filed Nov. 10, 2022.

*Primary Examiner* — Pedro J Cuevas
(74) *Attorney, Agent, or Firm* — Workman Nydegger (57) ABSTRACT

A Kaplan-type turbine includes a stator part and a rotor part; the stator part having a conduit, configured to convey a water flow towards an impeller having a rotation axis, and a stator of an electric generator, while the rotor part includes: an impeller having in turn: an ogive with at least three blades with variable angular setup with respect to an inclination axis substantially orthogonal to the rotation axis; a rotation shaft bearing the impeller; adjustments for adjusting the setup of the blades, defined inside the ogive and the rotation shaft; a rotor of the electric generator, fixed to the rotation shaft. The adjustments for adjusting the setup of the blade include for each blade: a load-bearing disc, from which one blade develops, which load-bearing disc is constrained to rotate on the ogive around the inclination axis; a lever, fixed to the load-bearing disc and developing radially inside the (Continued)

ogive; a manoeuvring rod, pivoted to the lever and to a drive slider.

12 Claims, 7 Drawing Sheets

(58) Field of Classification Search
CPC .............. F05B 2260/74; F05B 2260/79; F05B 2270/605; Y02E 10/20
See application file for complete search history.

(56) References Cited

FOREIGN PATENT DOCUMENTS

| DE | 10 2020 104347 A1 | 12/2020 |
|----|-------------------|---------|
| FR | 1 164 027 A | 10/1958 |
| JP | S61-183477 U | 11/1986 |

\* cited by examiner

KAPLAN-TYPE TURBINE

BACKGROUND OF THE INVENTION

1. The Field of the Invention

The invention relates to a Kaplan-type turbine.

2. The Relevant Technology

Nowadays, in every sector, there is an increasing need to pursue production and manufacturing choices that pay great attention to ecology and, consequently, maximum respect for the environment.

In Kaplan-type turbines, as the hydraulic operating conditions change, it is desirable to be able to vary the inclination angle of the blades in order to operate with better performance.

The blade movement mechanics are generally composed, for each blade, of a 'connecting rod-crank'-type kinematics, comprising a spider, translatable along the rotation axis of the turbine, to which spider all the connecting rods of the blades are hinged.

The translatory motion of the spider along the rotation axis of the turbine causes, through the respective 'connecting rod-crank' kinematics, an angular movement of the blade itself.

Such a mechanism ensures the synchronism of the rotation between the blades.

In current solutions, the spider is moved by an oleodynamic servomotor on the machine, and the oil is fed through a rotating joint, the whole system being in rotation with the turbine itself.

These Kaplan-type turbines, although widely appreciated, therefore have this drawback related to the risk of environmental contaminations in the event of oil leakage from the oleodynamic servomotor or rotating joint.

In fact, mineral oils, used in the drives and for the lubrication of the reciprocating moving parts, can be highly polluting and the risk of them leaking out of the turbine into a catchment basin of the water flowing through the turbine itself must be avoided.

SUMMARY OF THE INVENTION

The task of the present invention is to develop a Kaplan-type turbine capable of overcoming the aforementioned drawbacks and limitations of the prior art.

In particular, it is an object of the invention to develop a Kaplan-type turbine that eliminates the risk of environmental contaminations due to oil leaks from the turbine itself.

Another object of the invention is to develop a Kaplan-type turbine with a strength and efficiency not inferior to similar Kaplan-type turbines of a known type.

The task, as well as the aforementioned objects, are achieved by a Kaplan-type turbine according to the claims.

Further characteristics of the Kaplan-type turbine are described in the dependent claims.

BRIEF DESCRIPTION OF THE DRAWINGS

The task and the aforesaid objects, together with the advantages that will be mentioned hereinafter, are indicated by the description of an embodiment of the invention, which is given by way of non-limiting example with reference to the attached drawings, where.

With reference to the aforementioned Figures, a Kaplan-type turbine according to the invention is indicated as a whole with the number 10.

DETAILED DESCRIPTION OF THE PREFERRED EMBODIMENTS

This turbine 10 comprises a stator part 11 and a rotor part 12.

Figure 1:
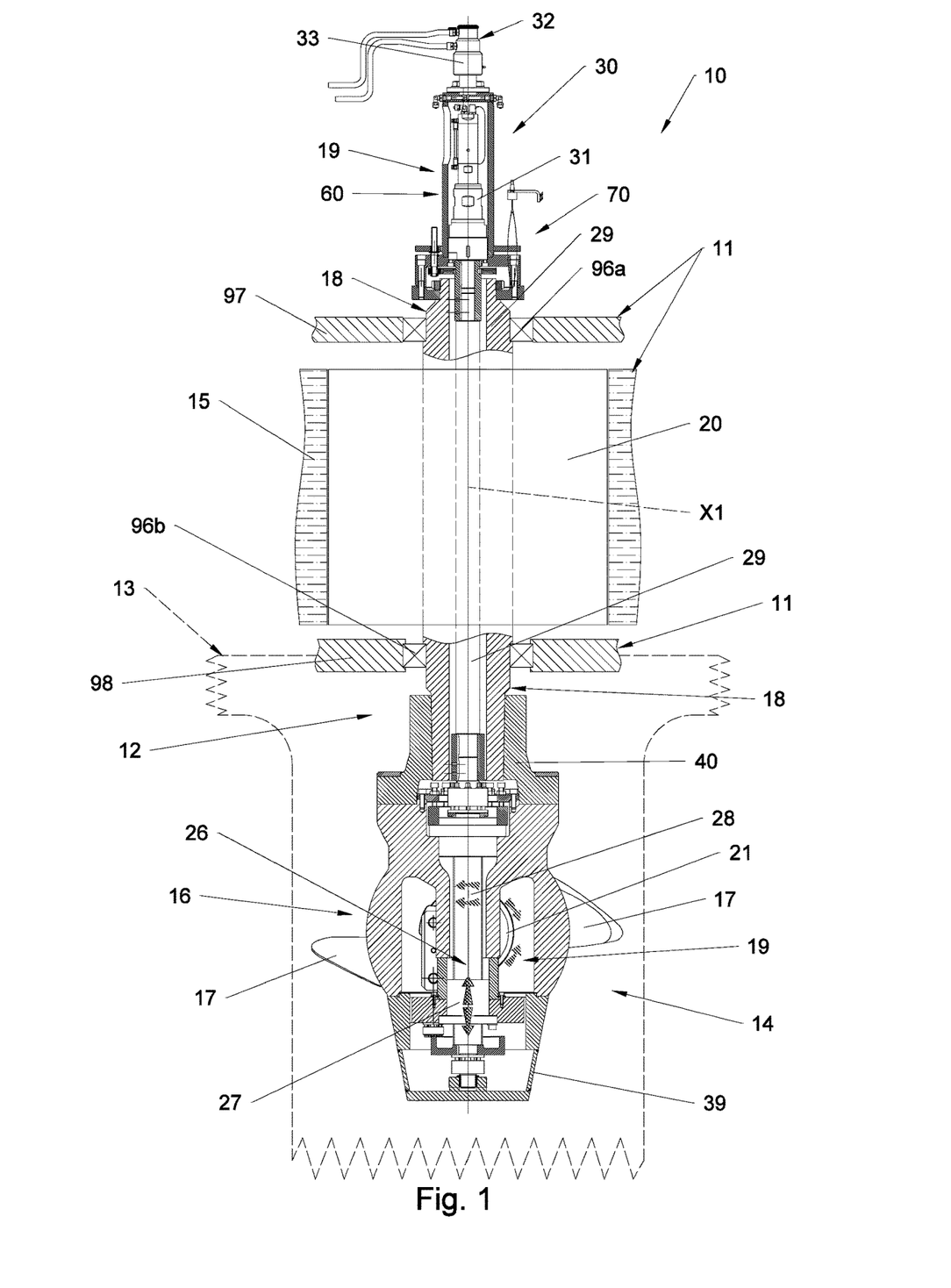
FIG. 1 represents a sectional side view of a Kaplan-type turbine according to the invention, according to the section line H-H of FIG. 2.
Figure 2:
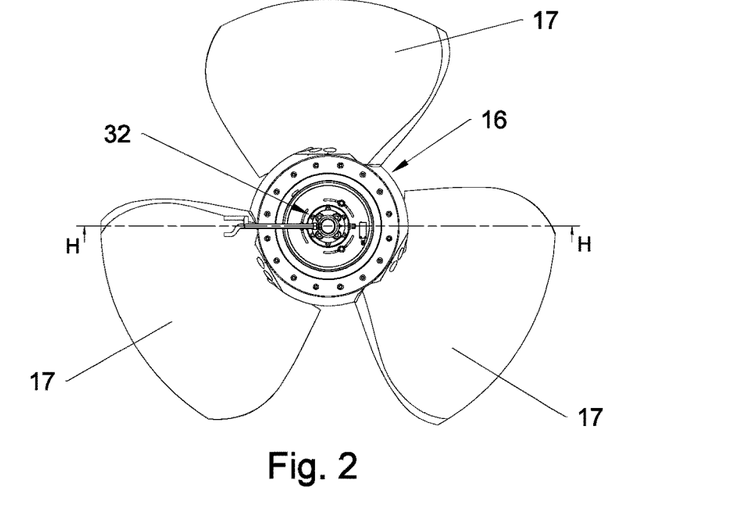
FIG. 2 represents a top view of the turbine according to the invention.

The stator part 11 comprises:

a conduit 13, schematically shown with a dotted line in FIG. 1, configured to convey a flow of water towards an impeller 14 having a rotation axis X1; said rotation axis X1 can be substantially vertical, or have another inclination;

a stator 15 of an electric generator.

Figure 3:
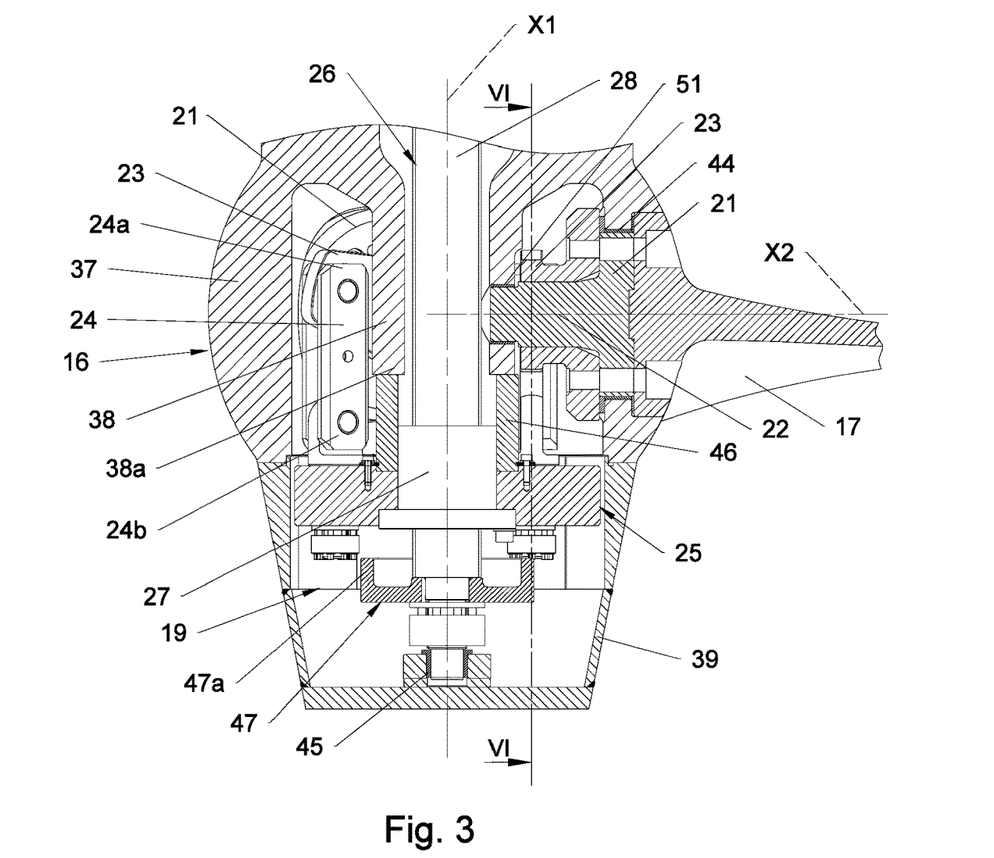
FIG. 3 represents a sectional side view according to the section line III-III indicated in FIG. 4.

The rotor part 12 comprises:

an impeller 14, having in turn:

an ogive 16 with at least three blades, for example but not exclusively three blades 17, each blade 17 being of the type with variable angular setup with respect to an inclination axis X2, where said inclination axis X2, clearly visible in FIG. 3, is substantially orthogonal to said rotation axis X1;

a rotation shaft 18 bearing the impeller 14;

adjustment means 19 for adjusting the setup of the blades 17, defined within said ogive 16 and said rotation shaft 18;

a rotor 20 of the electric generator, fixed to the rotation shaft 18 at said stator 15, as schematically shown in FIG. 1.

The peculiarity of the Kaplan-type turbine 10 according to the invention lies in the fact that the adjustment means 19 for adjusting the setup of the blade 17 comprise for each blade 17:

a load-bearing disc 21, from which a blade 17 develops, which load-bearing disc 21 is constrained to rotate on the ogive 16 around said inclination axis X2, as clearly visible in FIG. 3;

a lever 23, fixed to said load-bearing disc 21 and developing inside the ogive 16; in particular, the lever 23 develops radially with respect to the inclination axis X2;

a manoeuvring rod 24, pivoted at a first end 24a to said lever 23 and at a second opposite end 24b to a drive slider 25.

The means 19 for adjusting the setup of said blades 17 also comprise, within said ogive 16:

a drive slider 25, already mentioned above, to which the second ends 24b of said manoeuvring rods 24 are pivoted;

an axial translation system 26 for said drive slider 25, where said axial translation system 26 is of the type with a nut 27 and worm screw 28; the nut 27 is fixed to the drive slider 25 and the worm screw 28 is fixed coaxially to a drive shaft 29 positioned to operate inside said rotation shaft 18.

The means 19 for adjusting the setup of said blades 17 also comprise a pneumatic rotation actuator 30 for the drive shaft 29.

Figure 9:
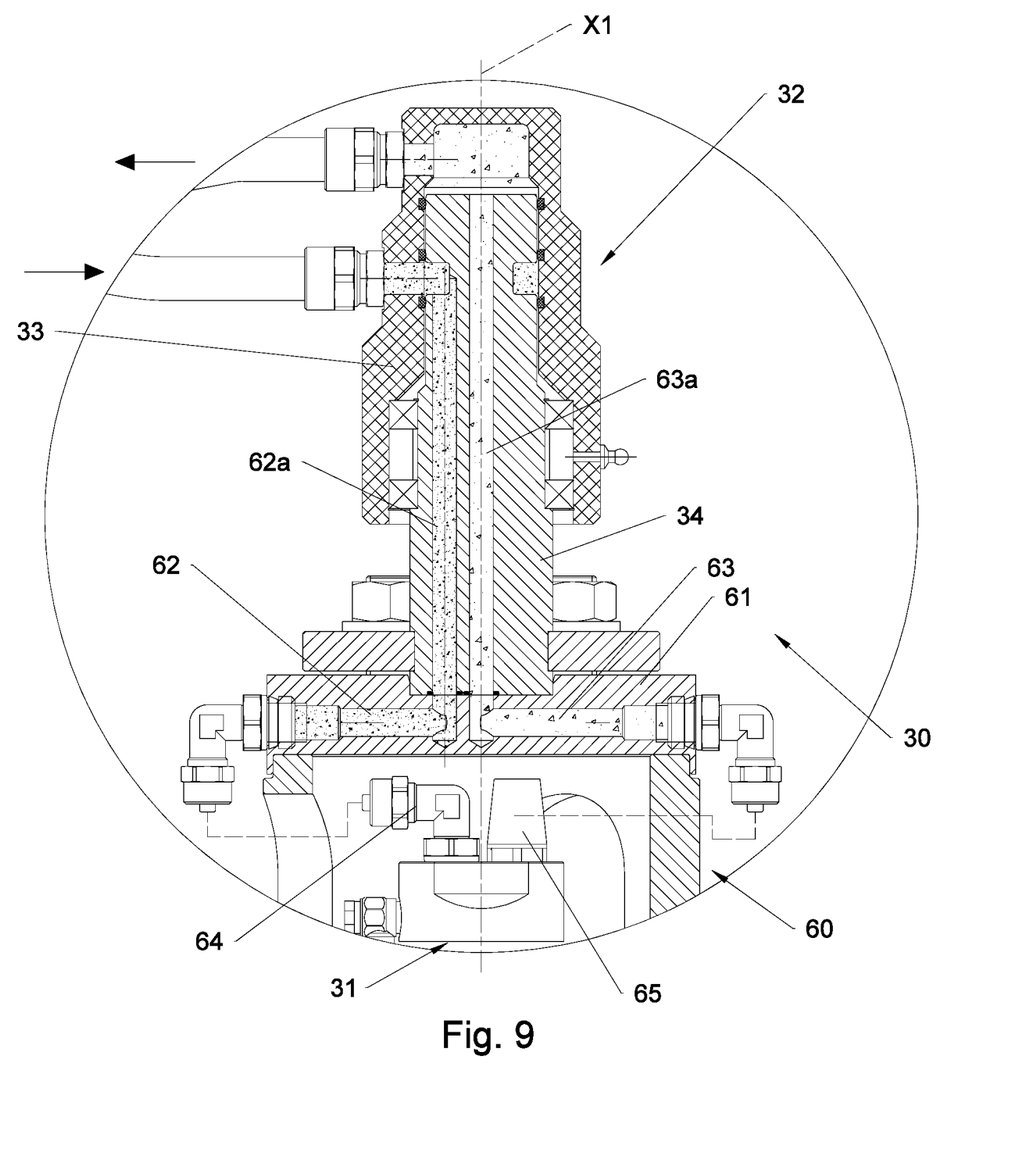
FIG. 9 represents a schematic sectional side view of a detail of FIG. 5.

The pneumatic rotation actuator 30 comprises:

a pneumatic motor 31 mounted on board the rotation shaft 18 and configured to rotate the drive shaft 29 with respect to said rotation shaft 18;

a pneumatic rotating joint 32, comprising an external stator body 33, clearly visible in FIG. 9, fixed to a fixed support structure, and an internal rotating body 34 configured for the transmission of compressed air to and from said pneumatic motor 31.

The rotation shaft 18 is internally hollow.

The drive shaft 29 is coaxial to the rotation shaft 18.

The drive shaft 29 passes through the rotation shaft 18 coaxially thereto.

The worm screw 28 is, for example and not exclusively, a recirculating ball screw.

The ogive 16 comprises an internally hollow bulb-shaped body 37, bearing a central collar 38, coaxial to the rotation shaft 18.

The ogive 16 comprises a bottom 39, which is fixed to the bulb-shaped body 37.

The ogive 16 is rigidly connected to the rotation shaft 18 through a hub 40.

The drive shaft 29 is connected at a first end to the pneumatic motor 31 and at the opposite second end to the worm screw 28.

The drive shaft 29 is connected to the worm screw 28 by means of a joint 42.

The locking of the joint 42 to the worm screw 28 is preferably carried out with a 'super-bolt' type clamping and tensioning system.

At the joint 42 there is also a support with bearings 43 for the worm screw 28.

The worm screw 28 passes through the central collar 38.

The worm screw 28 passes through the central collar 38 without coming into contact with it.

The worm screw 28 is rotatably constrained to the bottom 39 by a friction-reducing component, for example a bushing 45.

The central collar 38 defines with the bulb-shaped body 37 an interspace in which the levers 23 are housed with the respective manoeuvring rods 24.

In the embodiment described herein, by way of non-limiting example of the invention, each lever 23 is supported by a pin 22 which is fixed to the disc 21; still by way of example, each pin 22 forms a single body with the respective disc 21.

The central collar 38 develops cantilevered inside the bulb-shaped body 37.

Between the free end 38a of the central collar 38 and the bottom 39 there is defined a movement space for the slider 25 and for the nut 27 fixed to it.

Each of the discs 21 rotates in a corresponding seat defined on the bulb-shaped body 37 by interposition of a bushing 44 or another similar and technically equivalent friction-reducing component.

As mentioned above, and as visible in FIG. 3, each of the discs 21 comprises a radial pin 22 that develops from the disc 21 itself until it rests on a counter-shaped hole 51 defined on the central collar 38.

The radial pin 22 supports the lever 23.

The lever 23 comprises a fixing base 23a for fixing to the disc 21 and a head 23b for hinging to the manoeuvring rod 24.

The manoeuvring rod 24 comprises, for example, two symmetrical bars defining a fork hinged on one side to the lever 23 and on the opposite side to the slider 25.

For example, the slider 25 consists of a disc-shaped body.

Figure 6:
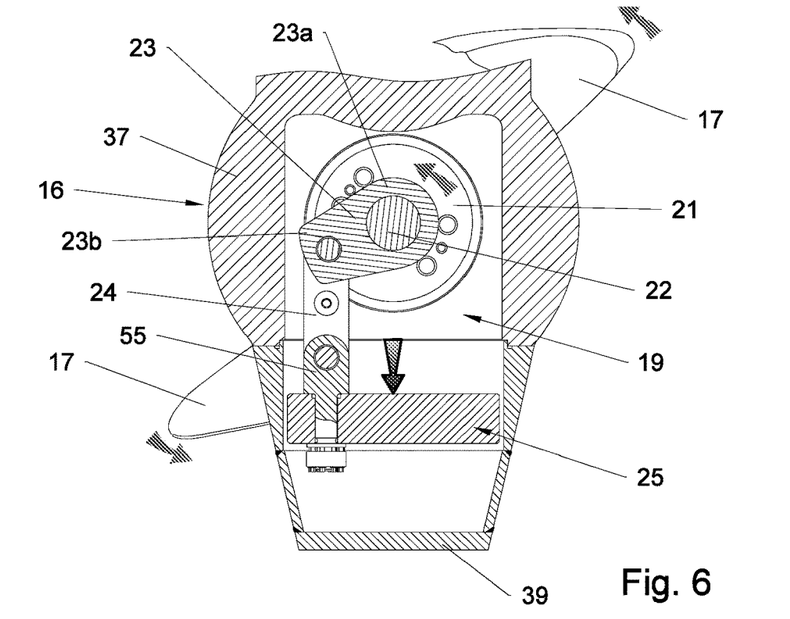
FIG. 6 represents a sectional view according to the section line VI-VI of FIG. 3, with the turbine according to the invention in a first operating setup of use.
Figure 7:
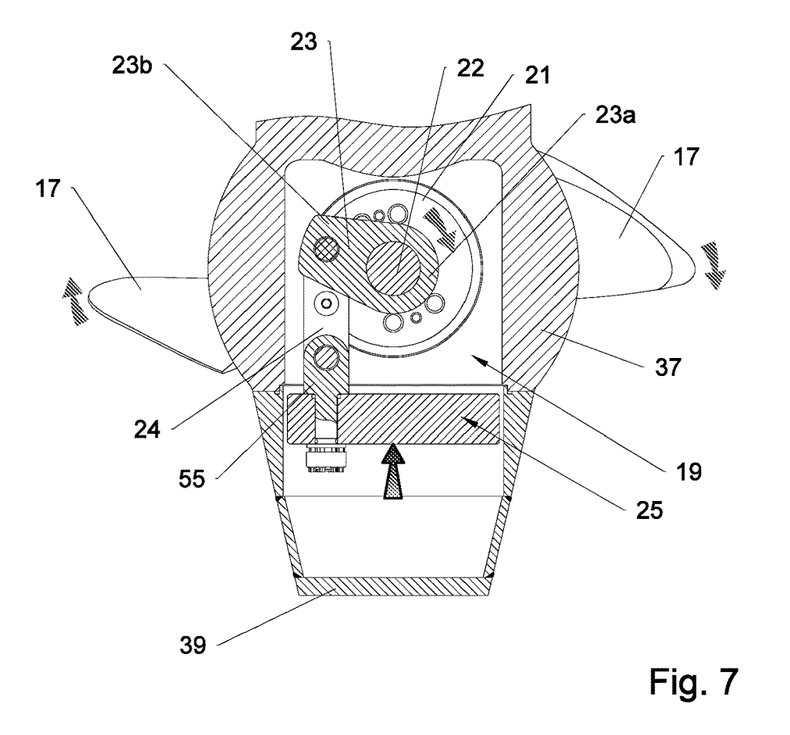
FIG. 7 represents the same view as FIG. 6, with the turbine according to the invention in a second operating setup of use.

As visible in FIGS. 6 and 7, the slider 25 comprises eyelets 55 configured to be hinged each to a corresponding end 24b of a manoeuvring rod 24.

The nut 27 is of the recirculating ball type.

Figure 4:
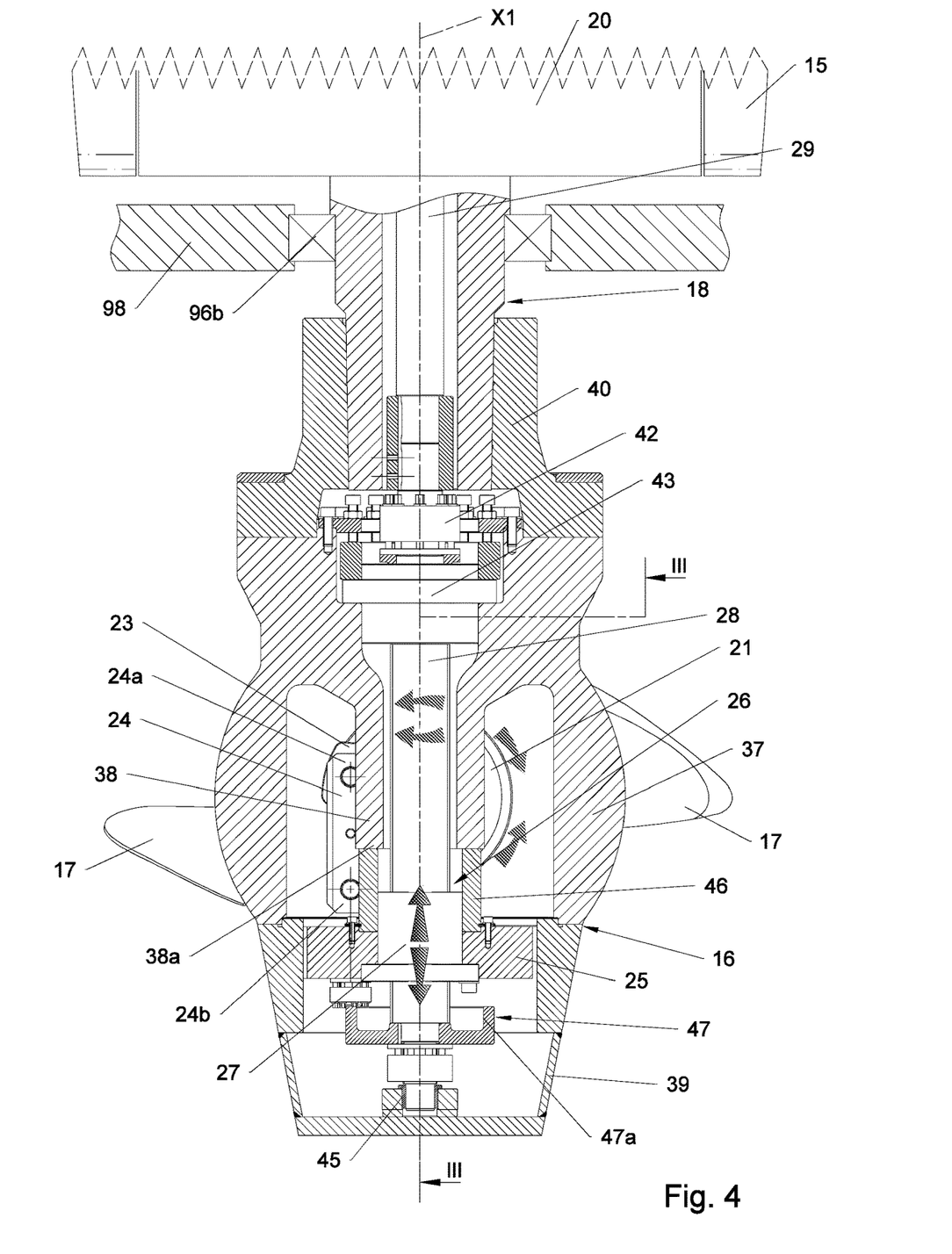
FIG. 4 represents a detail of FIG. 1.
Figure 5:
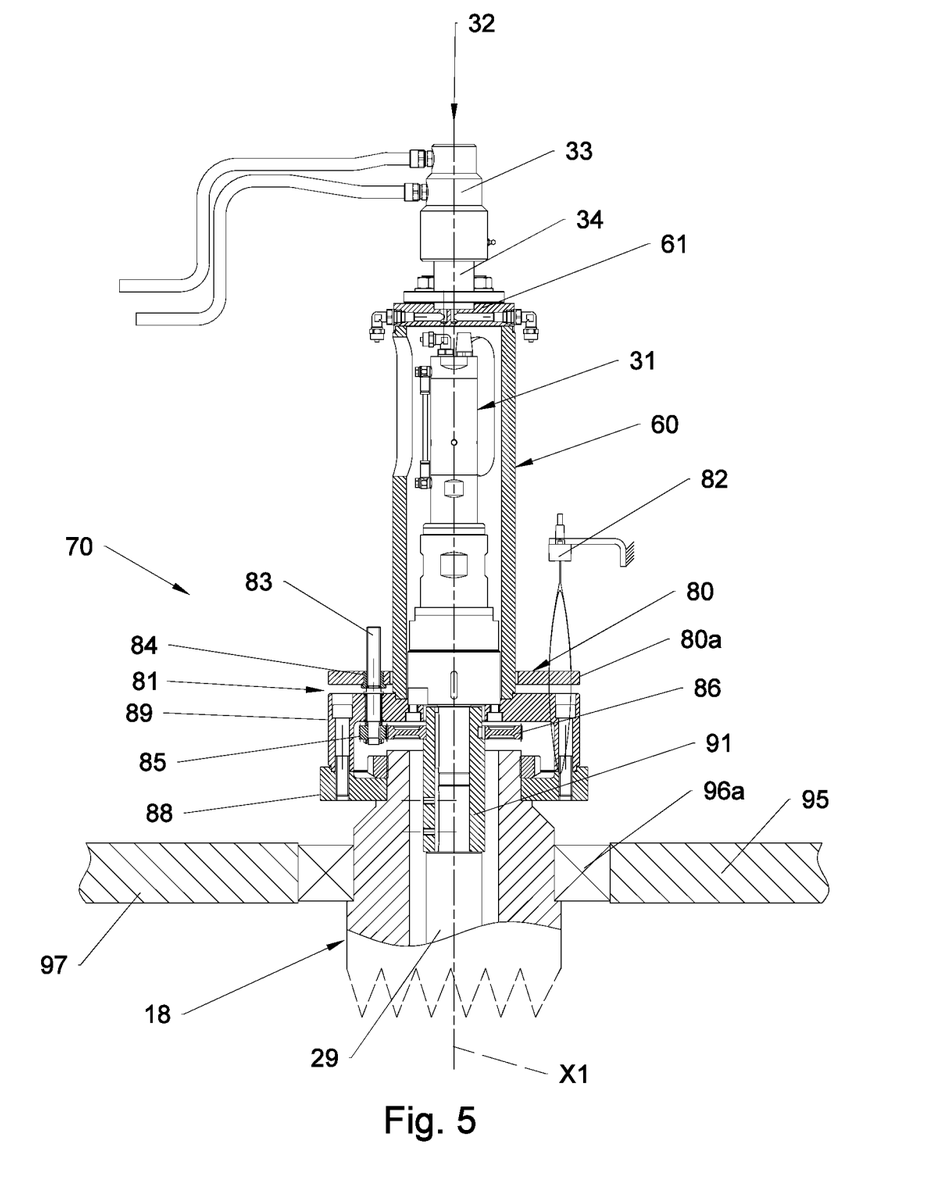
FIG. 5 represents another detail of FIG. 1.

The slider 25 is free to translate between an upper end-of-stroke setup, well exemplified in FIGS. 3, 4 and 7, and a lower end-of-stroke setup, exemplified in FIG. 6.

An upper end-of-stroke element 46, which defines the upper end-of-stroke setup, and a lower end-of-stroke element 47, which defines the lower end-of-stroke setup are therefore defined within the ogive 16.

Preferably, the upper end-of-stroke element 46 and the lower end-of-stroke element 47 are configured and positioned so as to meet the slider 25.

In the present non-limiting embodiment of the invention, the upper end-of-stroke element 46 consists of an annular body fixed to the slider 25 and configured to meet the lower edge of the free end 38a of the central collar 38.

Likewise, by way of example, the lower end-of-stroke element 47 consists of a disc with one or more rest projections 47a configured to meet the slider 25 and not the nut 27.

The lower end-of-stroke element 47 is fixed to the lower end of the worm screw 28.

In particular, and by way of example, the lower end-of-stroke element 47 is fixed to the worm screw 28 by means of a 'super-bolt' type clamping and tensioning system.

The pneumatic rotation actuator 30 also comprises a tubular support body 60 integral with and coaxial to the rotation shaft 18.

The pneumatic motor 31 is fixed inside this tubular support body 60.

As clearly visible in FIG. 9, the internal rotating body 34 of the pneumatic rotating joint 32 is fixed to a cover 61 of the tubular support body 60, so as to rotate coaxially to the rotation shaft 18.

The internal rotating body 34 is fixed to the outside of the tubular support body 60.

The cover 61 has two through channels 62 and 63 for compressed air, a first channel 62 and a second channel 63.

These first 62 and second 63 channels are connected with respective inlet/outlet conduits 62a and 63a defined on the internal rotating body 34 of the pneumatic rotating joint 32.

These first 62 and second 63 channels are connected with a corresponding inlet fitting 64 and a corresponding outlet fitting 65 of the pneumatic motor 31.

The first 62 and second 63 channels operate alternately one as an outward channel and the other as a return channel, and vice versa.

The external stator body 33 of the pneumatic rotating joint 32 is supported by a fixed, i.e., stationary, structural element not illustrated for simplicity's sake.

The pneumatic rotating joint 32 is in turn connected to an air compressor, which is obviously to be intended of a known type.

This air compressor is configured, for example, to circulate through the pneumatic rotating joint 32 air at a pressure of 6 bar.

The Kaplan-type turbine 10 according to the invention also comprises detection means 70 for detecting the angular position of the blades 17.

In the embodiment described herein of the invention, which is exemplary and non-limiting of the invention itself, the detection means 70 comprise:
- a movable body 80;
- displacement means 81 configured to displace said movable body 80 in a manner proportional to the rotation angle of said blades 17;
- a sensor 82 configured to detect the displacement of said movable body 80.

For example, the movable body 80 comprises an annular body 80a placed to surround the tubular support body 60.

The annular body 80a is constrained to one or more rotatable threaded stems 83 whose rotation causes the same annular body 80a to displace in a first direction or in a second opposite direction in the direction of the rotation axis X1.

Each of said rotatable threaded stems 83 is placed to rotate in a threaded bushing 84 fixed to the annular body 80a.

Each of the threaded stems 83 is placed to rotate with its main axis being parallel to the rotation axis X1.

Each of the threaded stems 83 has a driven toothed wheel 85.

Each driven toothed wheel 85 is meshed with a drive toothed wheel 86 integral with the drive shaft 29, i.e., fixed to the drive shaft 29.

The threaded stems 83 are supported by a support structure 87 fixed to the rotation shaft 18.

In particular, in the present embodiment, the support structure 87 comprises a base disc 88, fixed to the upper end of the rotation shaft 18, and an annular cover 89 to which the threaded stems 83 are rotatably constrained.

Figure 8:
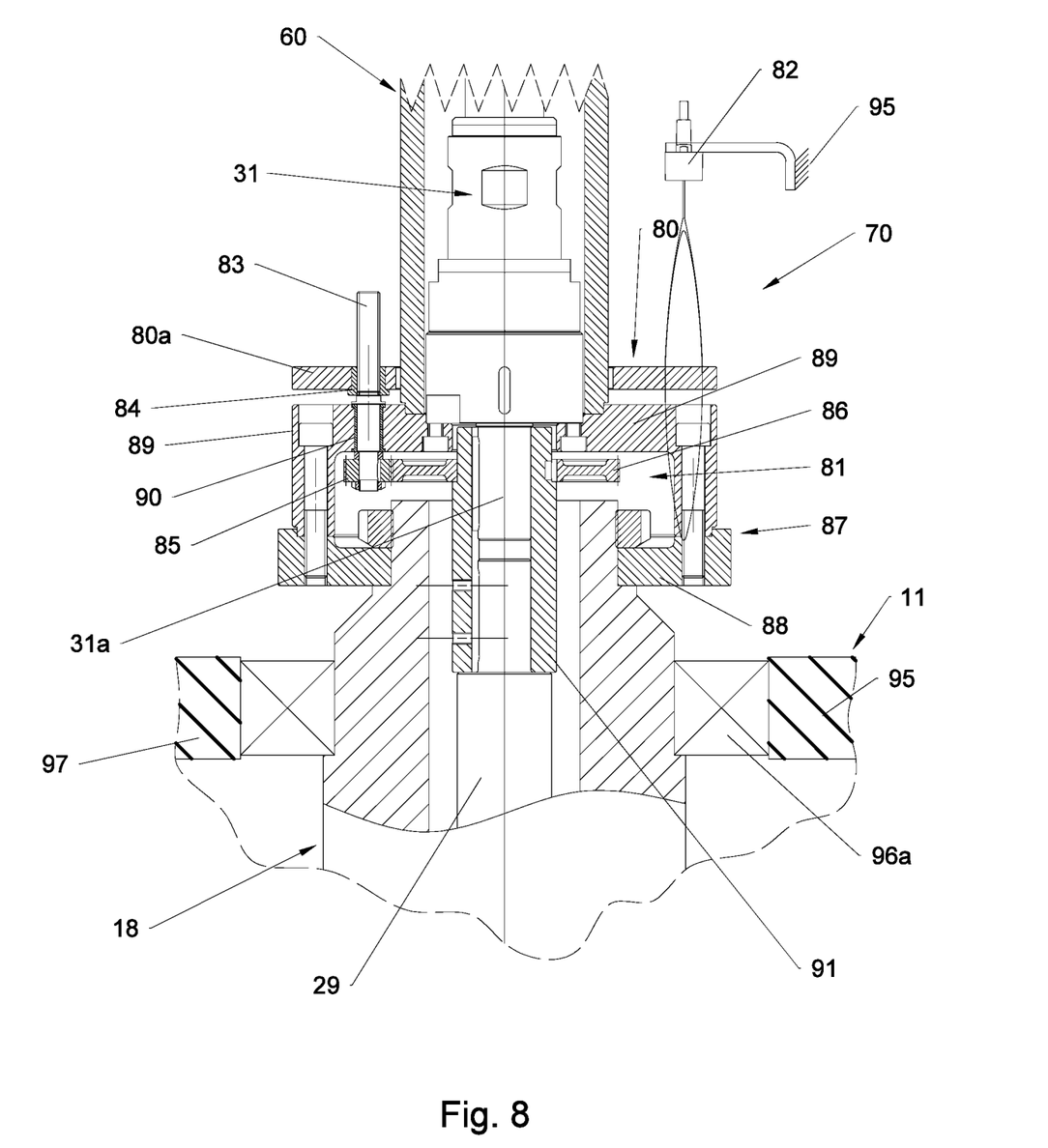
FIG. 8 represents a further detail of FIG. 1.

Each of the threaded stems 83 is rotatably constrained to the annular cover 89 by a corresponding bushing 90, clearly visible in FIG. 8.

The tubular support body 60 is fixed to the annular cover 89.

The pneumatic motor 31 is also fixed to the annular cover 89.

The rotating shaft 31a of the pneumatic motor 31 is fixed to the drive shaft 29 by means of a transmission sleeve 91, as clearly visible in FIG. 8.

The drive toothed wheel 86 is fixed, obviously coaxially, to the transmission sleeve 91.

The sensor 82 is, for example, an infrared sensor.

This sensor 82 is fixed to a fixed structural part 95 of the turbine 10 or of the compartment containing the turbine 10.

The sensor 82 faces the annular body 80a.

In particular, the sensor 82 faces the annular body 80a in a direction substantially parallel to the rotation axis X1.

The rotation of the drive shaft 29 with respect to the rotation shaft 18 causes the synchronous rotation of the threaded stems 83; the rotation of the threaded stems 83 in turn causes the displacement in the direction of the rotation axis X1 of the annular body 80a, either towards the sensor 82 or away from the sensor 82.

This displacement of the annular body 80a is detected by the sensor 82 and, through an electronic control unit, is transformed into a value of the inclination of the blades 17.

The position of the annular body 80a with respect to the sensor 82 is therefore proportional to the inclination angle of the blades 17 with respect to a predetermined angular reference.

The operation of the adjustment means 19 for adjusting the angular setup of the blades 17 is therefore described below.

If it is wished to change the setup of the blades 17, the external compressor is activated so that a pressurised air flow, for example at 6 bar, enters the pneumatic motor 31 through the pneumatic rotating joint 32.

The pneumatic motor 31 has a stator portion fixed to the tubular support body 60, in turn fixed to the rotation shaft 18 bearing the impeller 14, and a rotating shaft 31a fixed to the drive shaft 29.

The pneumatic motor 31 then induces the rotation of the drive shaft 29 in one rotation direction or in the opposite direction.

The rotation of the drive shaft 29, depending on the rotation direction, causes the translation of the nut 27 and hence of the slider 25 fixed to it or the lowering, i.e., towards the bottom 39 of the ogive 16, or the lifting, i.e., in the opposite direction.

The translation of the slider 25 in turn causes an action on the levers 23 of the blades 17 through the respective rods 24.

For example, in FIG. 6 it is exemplified that lowering the slider 25 results in a traction on the lever 23 downwards through the rod 24 and a consequent rotation in a first rotation direction, for example counterclockwise, of the disc 21 to which the blade 17 is fixed.

In FIG. 7 it is exemplified that lifting the slider 25 results in a thrust on the lever 23 upwards through the rod 24 and a consequent rotation in a second rotation direction, for example clockwise, of the disc 21 to which the blade 17 is fixed.

The translation of the slider 25 takes place, as mentioned above, between two end-of-stroke setups, one upper and one lower, each of which defines an angular limit position of each blade 17 beyond which the blade 17 cannot rotate with respect to its inclination axis X2.

The rotation shaft 18 is supported by at least two bearings 96a and 96b at the ends thereof, which bearings are in turn constrained to corresponding fixed radial supports 97 and 98.

Practically, it has been established that the invention achieves the intended task and objects.

In particular, with the invention a Kaplan-type turbine has been developed that allows to eliminate the risk of environmental contaminations due to oil leaks from the turbine itself, thanks to means for adjusting the angular setup of the blades that work without any use of oil or other liquid.

In addition, with the invention a Kaplan-type turbine has been developed with no less robustness and efficiency than similar Kaplan turbines of known type.

The invention thus conceived is susceptible to many modifications and variants, all falling within the same inventive concept; furthermore, all details can be replaced by other equivalent technical elements.

In practice, the components and materials used, as well as the dimensions and contingent shapes, as long as they are compatible with the specific use, can be any according to requirements and the state of the art.

Where the features and techniques mentioned in any claim are followed by reference marks, such reference marks are intended to be affixed solely for the purpose of increasing the intelligibility of the claims and, consequently, such reference marks have no limiting effect on the interpretation of each element identified by way of example by such reference marks.

The invention claimed is:

1. A Kaplan-type turbine, comprising a stator part and a rotor part,
said stator part comprising:
a conduit configured to convey a water flow towards an impeller having a rotation axis;
a stator of an electric generator;
said rotor part comprising:
an impeller having in turn:
an ogive with at least three blades having a variable angular setup with respect to an inclination axis (X2) substantially orthogonal to said rotation axis (X1);
a rotation shaft bearing said impeller;
adjustment means for adjusting the setup of said blades, defined within said ogive and said rotation shaft;
a rotor of said electric generator, fixed to said rotation shaft at said stator;
said means for adjusting the setup of said blades comprising for each blade:
a load-bearing disc, from which one said blade develops, said load-bearing disc being constrained to rotate on said ogive around said inclination axis (X2);
a lever, fixed to said load-bearing disc and developing inside said ogive;
a manoeuvring rod, pivoted at a first end to said lever and at a second opposite end to a drive slider;
said means for adjusting the setup of said blades comprising, within said ogive, also:
a drive slider, to which said second ends of said manoeuvring rods are pivoted;
an axial translation system for said drive slider, said axial translation system being of the nut and worm screw type, said nut being fixed to said drive slider and said worm screw being coaxially fixed to a drive shaft positioned to operate within said rotation shaft;
wherein said means for adjusting the setup of said blades also comprise a pneumatic rotation actuator for said drive shaft.

2. The turbine according to claim 1, wherein said pneumatic rotation actuator comprises:
a pneumatic motor mounted on board said rotation shaft and configured to rotate said drive shaft with respect to said rotation shaft;
a pneumatic rotating joint, comprising an external stator body fixed to a fixed support structure, and an internal rotating body configured to transmit compressed air to and from said pneumatic motor.

3. The turbine according to claim 1, wherein said rotation shaft is internally hollow, and in that said drive shaft is coaxial to the rotation shaft.

4. The turbine according to claim 1, wherein said worm screw is a recirculating ball screw.

5. The turbine according to claim 1, wherein said ogive comprises an internally hollow bulb-shaped body, bearing a central collar, coaxial to the rotation shaft, said ogive comprising a bottom, which is fixed to said bulb-shaped body, said ogive being rigidly connected to said rotation shaft by means of a hub.

6. The turbine according to claim 5, wherein said worm screw passes through the central collar and is constrained to said bottom by a friction-reducing component.

7. The turbine according to claim 5, wherein said central collar develops cantilevered inside the bulb-shaped body, between the free end of said central collar and said bottom there being defined a movement space for the slider and for the nut fixed thereto, said slider being free to translate between an upper end-of-stroke setup and a lower end-of-stroke setup, inside said ogive there being defined an upper end-of-stroke element, which defines the upper end-of-stroke setup, and a lower end-of-stroke element, which defines the lower end-of-stroke setup.

8. The turbine according to claim 1, wherein said drive shaft is connected at a first end to said pneumatic motor and at the opposite second end to said worm screw, said drive shaft being connected to said worm screw by means of joint.

9. The turbine according to claim 1, wherein said pneumatic rotation actuator comprises a tubular support body integral with the rotation shaft and coaxial to it, said pneumatic motor being fixed inside said tubular support body, said internal rotating body of said pneumatic rotating joint being fixed to a cover of said tubular support body, so as to rotate coaxially to the rotation shaft.

10. The turbine according to claim 1, comprising detection means for detecting the angular position of the blades.

11. The turbine according to claim 10, wherein said detection means comprise:
a movable body;
displacement means configured to displace said movable body in a manner proportional to the rotation angle of said blades;
a sensor configured to detect the displacement of said movable body.

12. The turbine according to claim 11, wherein said movable body comprises an annular body placed to surround the tubular support body, said annular body being constrained to one or more rotatable threaded stems whose rotation causes the displacement of the same annular body in a first direction or in a second opposite direction in the direction of the rotation axis (X1), each of said rotatable threaded stems being placed to rotate in a threaded bushing fixed to the annular body, each of said threaded stems being placed to rotate with its main axis that is parallel to the rotation axis (X1), each of said threaded stems having a driven toothed wheel, each driven toothed wheel being meshed with a drive toothed wheel integral with the drive shaft.

* * * * *